United States Patent
Cao et al.

(10) Patent No.: US 12,457,313 B2
(45) Date of Patent: Oct. 28, 2025

(54) THREE-DIMENSIONAL (3D) RECONSTRUCTION DEVICE AND METHOD OF FLAME SPECTRA

(71) Applicant: NANJING UNIVERSITY, Jiangsu (CN)

(72) Inventors: Xun Cao, Jiangsu (CN); Lijing Cai, Jiangsu (CN); Yan Zhang, Jiangsu (CN); Zhengyu Liu, Jiangsu (CN); Chen Wang, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 284 days.

(21) Appl. No.: 18/251,410

(22) PCT Filed: May 12, 2021

(86) PCT No.: PCT/CN2021/093258
§ 371 (c)(1),
(2) Date: May 2, 2023

(87) PCT Pub. No.: WO2022/116478
PCT Pub. Date: Jun. 9, 2022

(65) Prior Publication Data
US 2023/0421746 A1  Dec. 28, 2023

(30) Foreign Application Priority Data
Dec. 4, 2020  (CN) .......................... 202011397676.0

(51) Int. Cl.
*H04N 13/282* (2018.01)
*G06T 5/70* (2024.01)
*G06T 15/00* (2011.01)

(52) U.S. Cl.
CPC ............. *H04N 13/282* (2018.05); *G06T 5/70* (2024.01); *G06T 15/00* (2013.01)

(58) Field of Classification Search
CPC .......... H04N 13/282; G06T 5/70; G06T 15/00
See application file for complete search history.

(56) References Cited

U.S. PATENT DOCUMENTS

| | | | |
|---|---|---|---|
| 2009/0251686 A1 | 10/2009 | Meynard et al. | |
| 2010/0194854 A1* | 8/2010 | Kroll | G03H 1/02 |
| | | | 348/E13.001 |

(Continued)

FOREIGN PATENT DOCUMENTS

| | | |
|---|---|---|
| CN | 105938101 A | 9/2016 |
| CN | 110400336 A | 11/2019 |
| CN | 112489200 A | 3/2021 |

OTHER PUBLICATIONS

Song, Erzhuang et al.; "A review on three-dimensional flame measurements based on tomography", Journal of Experiments in Fluid Mechanics; vol. 34, No. 1; Feb. 29, 2020; ISSN:1672-9897; pp. 1-11.

*Primary Examiner* — Mohamed A. Wasel
(74) *Attorney, Agent, or Firm* — NKL Law; Allen Xue

(57) ABSTRACT

A three-dimensional (3D) reconstruction device and a method of flame spectra are provided. The device has a plurality of prism-mask shooting systems and a plurality of mirrors. The prism-type shooting systems are set up around a combustion area to be reconstructed and each is provided with two mirrors which are tilted on the left and right of an axis of the shooting system, so that data of a flame are reflected by the mirrors into the prism-mask shooting systems, thus realizing the real-time acquisition of hyperspectral data of the flame from multiple shooting angles. The reconstruction method includes following steps of acquiring, by a calibration cylinder, an area to be reconstructed, synchronously acquiring and preprocessing hyperspectral data of a flame, and finally reconstructing 3D spectral data of the flame by a 3D reconstruction algorithm of flame spectra.

7 Claims, 4 Drawing Sheets

(56) References Cited

U.S. PATENT DOCUMENTS

2017/0202439 A1* 7/2017 Wu ........................ H04N 23/58
2021/0375036 A1* 12/2021 Zhao ........................ G06T 7/60

* cited by examiner

THREE-DIMENSIONAL (3D) RECONSTRUCTION DEVICE AND METHOD OF FLAME SPECTRA

TECHNICAL FIELD OF THE INVENTION

The present invention relates to the field of computational photography and combustion diagnosis, in particular to a three-dimensional (3D) reconstruction device and a method of flame spectra.

BACKGROUND OF THE INVENTION

Although new CT reconstruction algorithms have been proposed, both analytic reconstruction algorithms based on the Radon transformation and iterative reconstruction algorithms based on the main idea of solving equations have their limitations in the field of reconstruction: the former is poor in noise immunity and highly demanded for data completeness, while the latter suffers from banding artifacts, a common defect of iterative reconstruction algorithms.

Different combustion components in a flame have different spectral characteristics during combustion, and fuel components involved in combustion reactions can be effectively analyzed through combustion spectra. For complex combustion reactions with multiple components, correlation analysis of multi-dimensional spectral characteristics of the combustion spectral data can reflect the internal relations of all combustion components. How to obtain accurate 3D spectral data is of great significance for revealing the essential characteristics of combustion and exploring the evolution law of combustion processes.

At present, the spectral information of the flame is mostly obtained by single-point spectrometers, or scanning spectrometers. However, neither the single-point spectrometers nor the scanning spectrometers can obtain dynamic spectral information of the flame with 3D spatial resolution. Scanning Laser Optical Tomography (SLOT) is an existing spectral tomography technique, which reconstructs a tomographic spectrum through single-point scanning, rotating shooting and back-projection algorithm. However, this technique cannot be applied in the field of combustion diagnosis due to many limitations.

SUMMARY OF THE INVENTION

In view of the fact that there is no effective way to obtain 3D flame spectra, an objective of the present invention is to provide a three-dimensional (3D) reconstruction device and a method of flame spectra, by which reconstructed spectra are high in data accuracy and three-dimensional, and also contain hyperspectral information.

To achieve the above objective, a technical solution employed in the present invention is as follows.

A 3D reconstruction device of flame spectra is provided, having a plurality of prism-mask shooting systems and a plurality of mirrors; the prism-type shooting systems are arranged around a combustion area to be reconstructed and each is provided with two mirrors which are tilted on the left and right of an axis of the shooting system, so that data of a flame is reflected by the two mirrors into the prism-mask shooting systems, thus realizing the real-time acquisition of hyperspectral data of the flame from multiple shooting angles.

A reconstruction method using the 3D reconstruction device of flame spectra is provided in the present invention, including following steps of:

(1) placing a calibration cylinder in an area to be reconstructed, capturing images of the calibration cylinder, and extracting corner coordinates of the calibration cylinder in all directions in the images as corner coordinates of the area to be reconstructed in all directions;

(2) removing the calibration cylinder and setting a fire in the combustion area to be reconstructed, capturing images of a flame from different shooting angles synchronously by a plurality of prism-mask shooting systems and a plurality of reflectors to obtain hyperspectral data of the flame, and pre-processing the data; and (3) reconstructing 3D structures of the flame in all spectral channels by a 3D reconstruction algorithm of flame spectra.

Further, pre-processing in the step (2) includes following specific steps of:

perspectively transforming, by the corner coordinates of the area to be reconstructed extracted in the step (1), the data of the flame obtained by capturing images into a matrix of a fixed size for data alignment; and integrating the denoised data obtained into a same layer and different shooting angles into a vector, and integrating the vectors of the data from different layers and different bands into a 3D matrix B, where the three dimensions of the matrix represent projection ray, layer and band, respectively.

Further, in the step (3), the 3D structures of the flame spectrum in all spectral channels are reconstructed by a joint iterative algorithm in which spot-spot correction is performed, i.e., a correction term of the image in the current iteration is the sum of errors between projected pixels generated by all rays intersecting the $j^{th}$ pixel and projected pixels corrected in the previous iteration.

Further, for initial value assignment in the joint iterative reconstruction algorithm in each band, the initial value for iteration of the data in the first layer is a zero vector, and that for iterations of the data in other layers is the iterated result of the data in the previous layer.

Further, in the joint iterative reconstruction algorithm, the relaxation factor $\lambda_{j,t,s}^{k}$ is obtained by steepest descent:

$$\lambda_{j,t,s}^{k} = \frac{\left\| W^T(P_{i,t,s} - WX_{t,s}^k) \cdot *[W^T(P_{i,t,s} - WX_{t,s}^k)]\right\|_1}{\left\| W^T W W^T(P_{i,t,s} - WX_{t,s}^k) \cdot *[W^T(P_{i,t,s} - WX_{t,s}^k)]\right\|_1}$$

where $X_{t,s}^{k}$ is a result obtained after k iterations of the data in the $t^{th}$ layer and the $s^{th}$ band, W is a coefficient matrix, $W^T$ is a transpose of the matrix, and $\|\ \|_1$ represents finding 1-norm.

Further, in the joint iterative reconstruction algorithm, a formula for determining convergence is provided as an end condition of the iteration process:

$$|P_{i,t,s} - WX_{t,s}^k|_2 \leq \varepsilon * N$$

where $\varepsilon$ is a default threshold.

Further, in the joint iterative reconstruction algorithm, the coefficient matrix W is binarized according to projection information from each shooting angle to obtain a filter operator, and the results obtained after iterations are filtered:

$$X_{out_{t,s}} = X_{t,s} \cdot *\text{Mask}_t$$

where $X_{out_{t,s}}$ represents a filtered result in the $t^{th}$ layer and the $s^{th}$ band, $X_{t,s}$ is a result obtained after iterations in the $t^{th}$ layer and the $s^{th}$ band, and $Mask_t$ is a filter operator in the $t^{th}$ layer.

The reconstructed spectra in the present invention are high in data accuracy and can accurately reconstruct 3D hyperspectral information of flames. The significant advantages of the present invention over the prior art are as follows.

(1) According to the present invention, hyperspectral information of the flame can be quickly obtained, and hyperspectral 3D data of the flame can be reconstructed.

(2) According to the present invention, 3D data of the flame can be well reconstructed even with relatively few data acquisition angles, thus greatly saving the cost.

(3) Compared with the existing reconstruction algorithms, the reconstruction algorithm of the present invention can synchronously allow the data alignment and the extraction of the area to be reconstructed in an easy and fast manner by the calibration cylinder.

(4) Compared with the existing iterative reconstruction algorithms, the filter operator in the reconstruction algorithm in the present invention can eliminate the banding artifacts caused by iterative reconstruction and realistically restore the 3D structures of the flame spectrum.

(5) Based on the similarity of the continuous layer distribution of the flame, the initial value assignment scheme used in the reconstruction algorithm of the present invention greatly speeds up the convergence of the reconstruction process.

(6) According to the present invention, the steepest descent is adopted to calculate the relaxation factor, so that the convergence speed of iteration solution is improved.

DETAILED DESCRIPTION OF THE INVENTION

The present invention will be described in detail below with reference to the accompanying drawings by embodiments.

Figure 1:
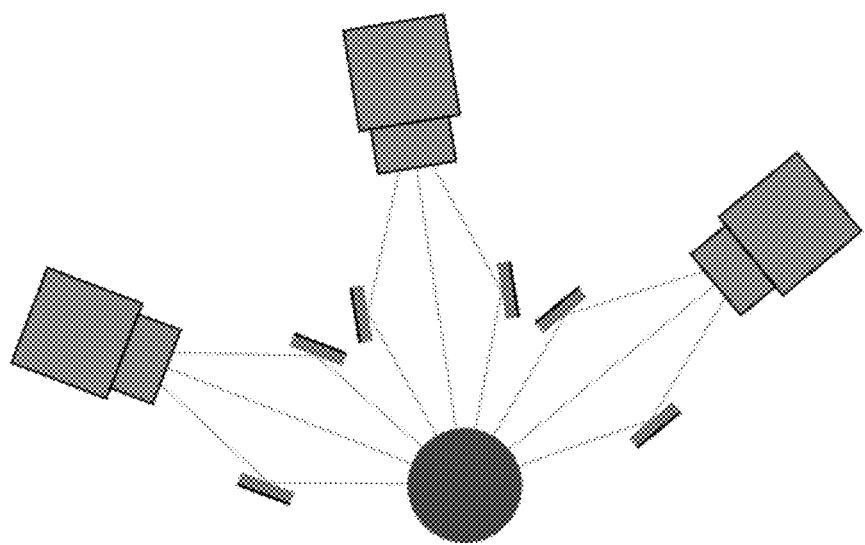
FIG. 1 is a structural diagram of a device according to the present invention.
Figure 2:
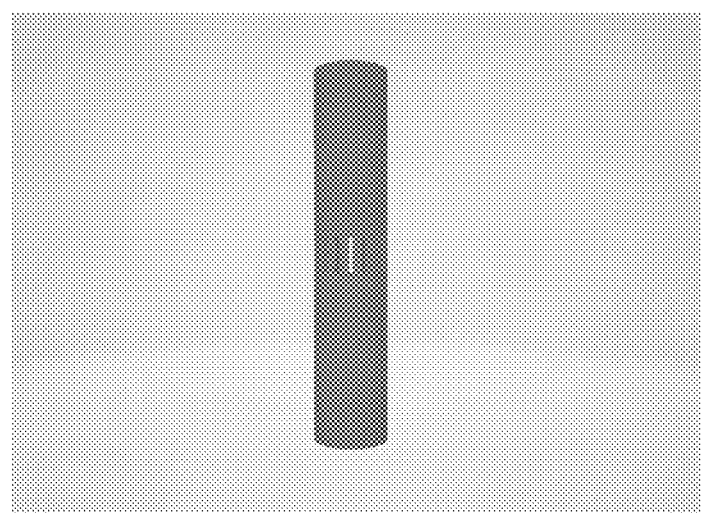
FIG. 2 is a schematic diagram of a calibration cylinder.

In this embodiment, as shown in FIG. 1, three prism-mask shooting systems and six mirrors are set up to form a spectral video camera system with nine shooting angles, and one prism-mask shooting system and two mirrors are shared by every three adjacent shooting angles, and the two mirrors are tilted on the left and right of an axis of the shooting system, so that the light from the flame is reflected into the prism-mask shooting systems. Before setting up the system, a calibration cylinder with nine apertures will be placed in a combustion area to be reconstructed, as shown in FIG. 2. The angles of the apertures are the shooting angles, which are set to 0, 20, 40, 60, 80, 100, 120, 140 and 160 degrees.

Taking the calibration cylinder as the center, the position of the corresponding shooting system or plane mirrors is adjusted according to the images of the calibration cylinder and the aperture corresponding to the shooting angle captured by a sensor of the shooting system. In this embodiment, hyperspectral information can be obtained through the prism-mask shooting systems, and multi-FOV information can be obtained through the mirrors, thus realizing the real-time acquisition of multi-FOV and multi-spectral data.

(1) Three images of the calibration cylinder are captured when setting up the system, and each image contains the information of the calibration cylinder from three shooting angles. An area to be reconstructed in the direction of each shooting angle is generated based on coordinates of upper left, lower left, upper right and lower right corners of each image of the calibration cylinder, and a perspective transformation matrix $$\begin{bmatrix} m_{11} & m_{12} & m_{13} \\ m_{21} & m_{22} & m_{23} \\ m_{31} & m_{32} & m_{33} \end{bmatrix}$$

projected from the area to be reconstructed to a fixed size (500*142) is thus solved.

The perspective transformation formula is:

$$\begin{cases} X = m_{11}*x + m_{12}*y + m_{13} \\ Y = m_{21}*x + m_{22}*y + m_{23} \\ Z = m_{31}*x + m_{32}*y + m_{33} \end{cases}$$

$$\begin{cases} x' = \frac{X}{Z} = \frac{m_{11}*x + m_{12}*y + m_{13}}{m_{31}*x + m_{32}*y + m_{33}} \\ y' = \frac{Y}{Z} = \frac{m_{21}*x + m_{22}*y + m_{23}}{m_{31}*x + m_{32}*y + m_{33}} \end{cases}$$

$$\begin{bmatrix} m_{11} & m_{12} & m_{13} \\ m_{21} & m_{22} & m_{23} \\ m_{31} & m_{32} & m_{33} \end{bmatrix}$$

is solved to obtain:

$$(x,y) \rightarrow (x',y')$$

where (x, y) represents the corner coordinates of the calibration cylinder, and (x', y') represents the corner coordinates of the fixed-sized matrix.

(2) The calibration cylinder is removed and a fire is set in the combustion area to be reconstructed, images of the flame is captured from different shooting angles synchronously by the spectral video camera system with a plurality of shooting angles and a plurality of mirrors to obtain hyperspectral data of the flame, and the data obtained by capturing the images of the flame are preprocessed.

First, the data obtained by capturing images of the flame are processed into a matrix of a fixed size (500*142) by the perspective transformation matrix calculated in the previous step for data alignment.

Figure 3:
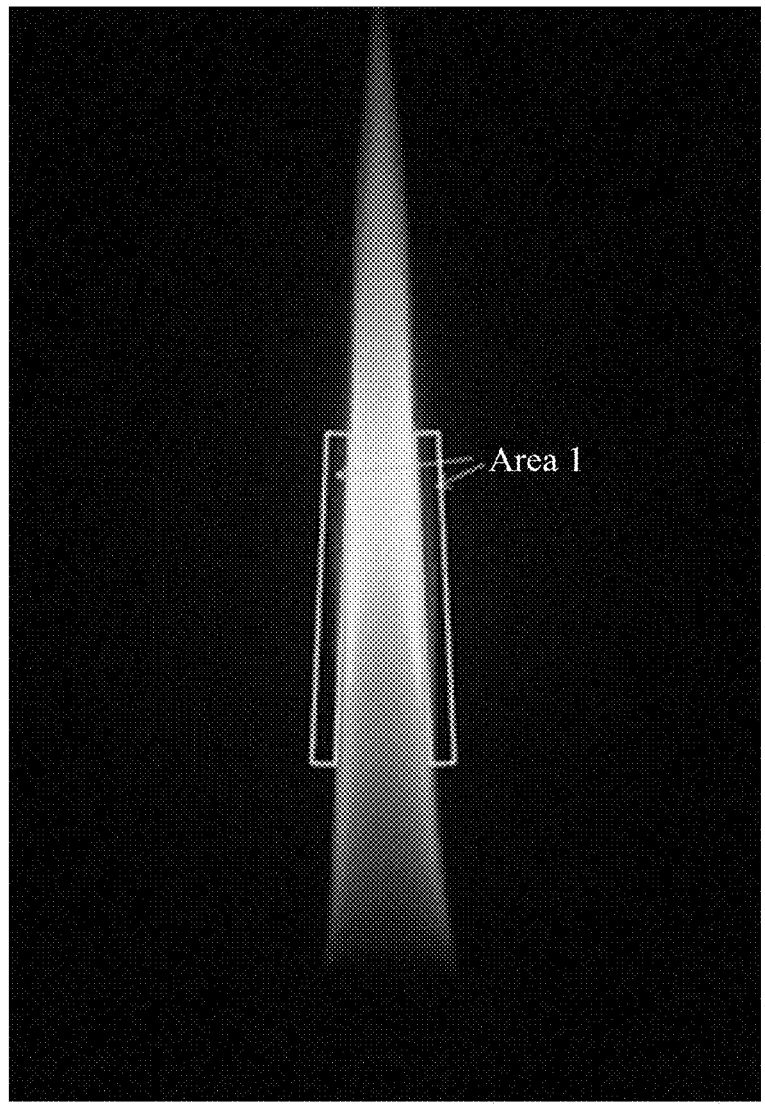
FIG. 3 is a distribution diagram of flame noise.

As shown in FIG. 3, the aligned data are denoised.

Among all data input, those less than a certain threshold (0.02) are set to 0, and background noise is removed based on:

$$f(x, y) = \begin{cases} 0, & f(x, y) < 0.02 \\ f(x, y), & f(x, y) > 0.02 \end{cases}$$

When $y=y_0$ in each layer, a first point $(x_1, y_0)$ meeting $f(x_1, y_0)-f(x_1, y_0-1)>0.05$ is found from left to right, a first point $(x_2, y_0)$ meeting $f(x_2, y_0-1)-f(x_2, y_0)>0.05$ is found from right to left, the noise in the area 1 is removed according to the following formula:

$$f(x, y) = \begin{cases} 0, x < x_1 \\ f(x, y), x_1 \leq x \leq x_2 \\ 0, x > x_2 \end{cases}$$

where $f(x, y)$ represents the value of a point $(x, y)$.

Finally, the data shot from different shooting angles in the same layer are integrated into a vector $b_{ts}$, $$b_{ts}=[y_1,y_2,y_3,y_4,y_5,y_6,y_7,y_8,y_9]^T$$

where $b_{ts}$ represents the data projected in the $t^{th}$ layer and the $s^{th}$ band, $y_i$ represents the data collected from the $i^{th}$ shooting angle in the $t^{th}$ layer and the $s^{th}$ band, and the vectors in different layers and different bands are integrated into a 3D matrix B (the three dimensions represent projection ray, layer and band, respectively).

$$B=[[b_{1,1},b_{2,1},b_{3,1}, \ldots ,b_{500,1}],[b_{1,2},b_{2,2}, b_{3,2}, \ldots ,b_{500,2}], \ldots ,[b_{1,128},b_{2,128},b_{3,128}, \ldots ,b_{500,128}]]$$

(3) 3D structures of the flame are reconstructed in all spectral channels by a 3D reconstruction algorithm of flame spectra.

Figure 4:
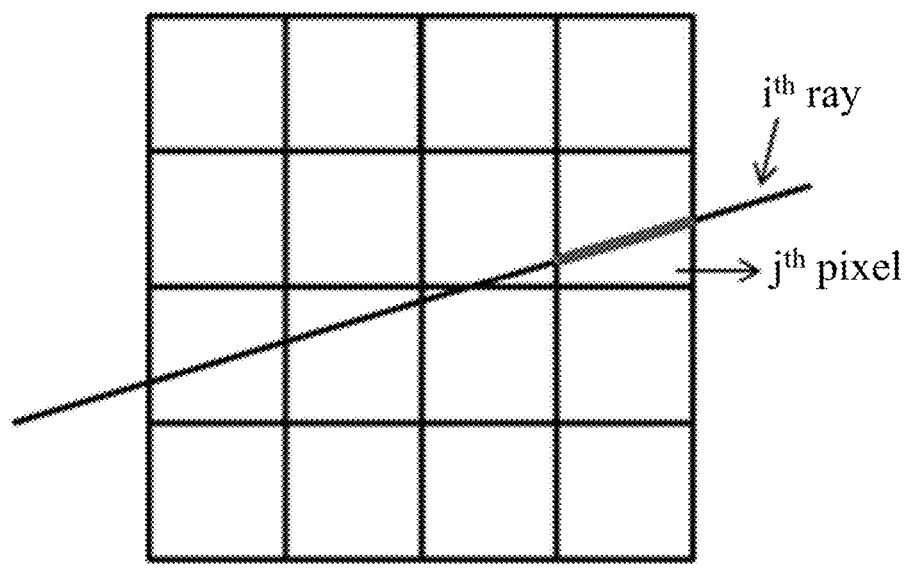
FIG. 4 is a geometric relation diagram of a coefficient matrix.
Figure 5:
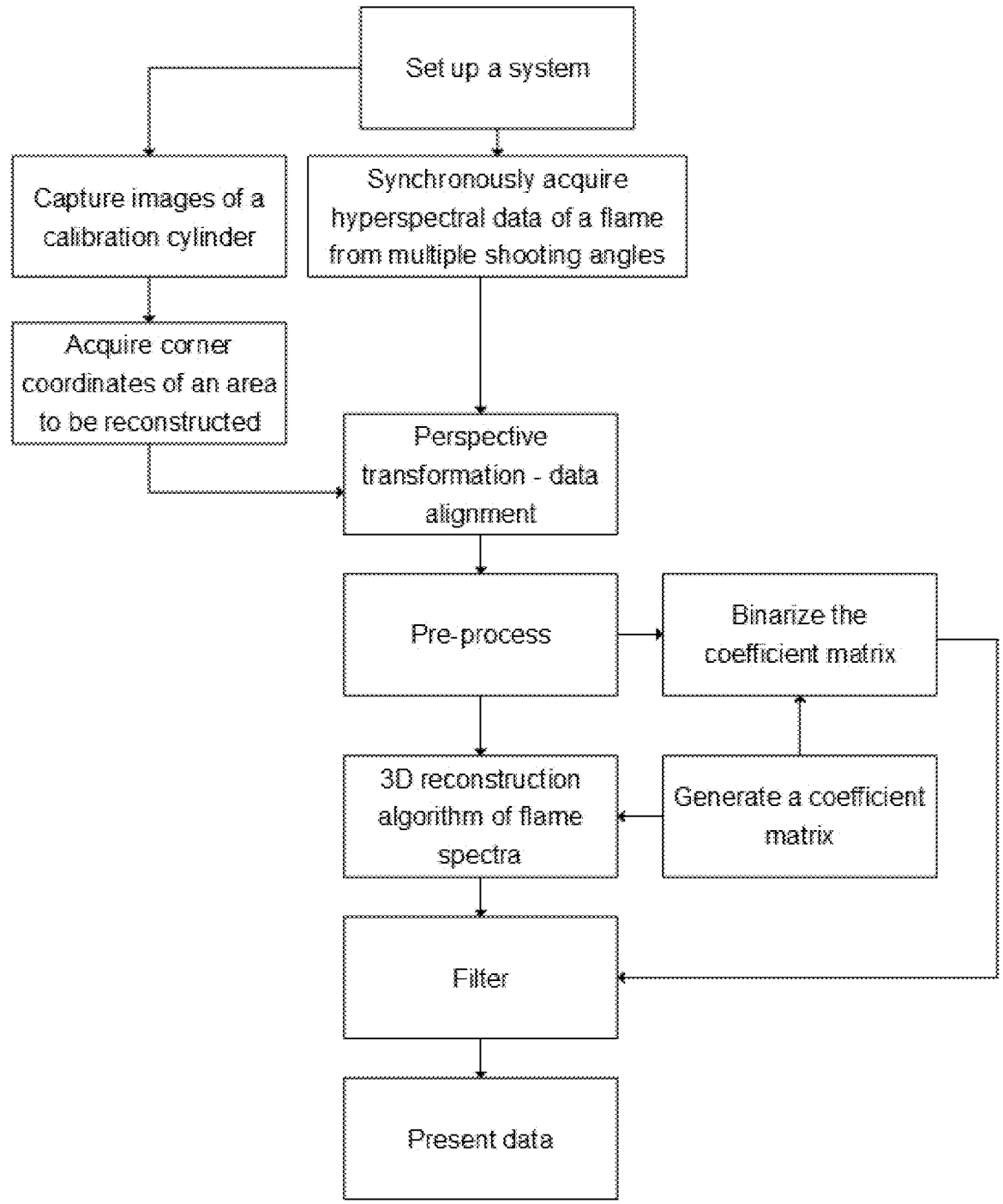
FIG. 5 is a flow chart of a method according to the present invention.

In this embodiment, before the reconstruction, a coefficient matrix W is solved, as shown in FIG. 4.

The 3D reconstruction algorithm of flame spectra requires that the 3D spectral structures of the flame are reconstructed in all spectral channels by the improved joint iterative algorithm. Iterative reconstruction algorithm refers to grid discretization of continuous images, which divides the entire image domain into $L=99^2$ pixels, i.e., squares with a side length of 99. The discrete value of each pixel itself is assumed to be a constant, and a vector $X=[x_1, x_1, \ldots, x_{99}]$ represents the image to be solved, while $P=[p_1, p_1, \ldots, p_{1278}]$ represents the projection imaging data obtained by projection of $R=9*142$ rays, where $R=MR_m$, $M=9$ represents projection angles, and $R_m=142$ is the number of detector elements from the $m^{th}$ projection angle. To reconstruct the image is to solve the formula $WX=P$, that is, to solve:

$$\begin{cases} w_{1,1}x_1 + w_{1,2}x_2 + \ldots + w_{1,9801}x_{9801} = P_1 \\ w_{2,1}x_1 + w_{2,2}x_2 + \ldots + w_{2,9801}x_{9801} = P_2 \\ \ldots \\ w_{1278,1}x_1 + w_{1278,2}x_2 + \ldots + w_{1278,9801}x_{9801} = P_{1278} \end{cases}$$

where $w_{i,j}$ represents the contribution of the $j^{th}$ pixel to the $i^{th}$ projected pixel.

According to the present invention, the 3D spectral structures of the flame are reconstructed in all spectral channels by the improved joint iterative algorithm in which spot-spot correction is performed, i.e., a correction term of the image in the current iteration is the sum of errors between projected pixels generated by all rays intersecting the $j^{th}$ pixel and projected pixels corrected in the previous iteration, the data B collected and processed previously are input, and the formula for iterations is as follows:

$$x_{j,t,s}^k = \begin{cases} 0 + \lambda_{j,t,s}^k w_{ij} \sum_{i=1}^{1278}\left(P_{i,t,s} - \sum_{n=1}^{9801}(w_{in} \times 0)\right), t=1, k=1 \\ x_{j,t-1,s} + \lambda_{j,t,s}^k w_{ij} \sum_{i=1}^{1278}\left(P_{i,t,s} - \sum_{n=1}^{9801}(w_{in}x_{n,t-1,s})\right), t \neq 1, k=1 \\ x_{j,t,s}^{k-1} + \lambda_{j,t,s}^k w_{ij} \sum_{i=1}^{1278}\left(P_{i,t,s} - \sum_{n=1}^{9801}(w_{in}x_{n,t,s}^{k-1})\right), \text{other} \end{cases}$$

where $x_{j,t,s}^k$ represents a result obtained after the $k^{th}$ iteration of the $j^{th}$ pixel to be reconstructed in the $t^{th}$ layer and the $s^{th}$ band, $x_{j,t,s}$ represents a result obtained after iterations of the $j^{th}$ projected pixel in the $t^{th}$ layer and the $s^{th}$ band, $p_{i,t,s}=B(i, t, s)$ represents the $i^{th}$ projected pixel in the $t^{th}$ layer and the $s^{th}$ band, $\lambda_{j,t,s}^k$ is a relaxation factor for the current iteration, and $w_{ij}$ represents the contribution of the $j^{th}$ pixel to the $i^{th}$ projected pixel, i.e., the length of rays in pixels; M represents the number of projected pixels, and N represents the number of pixels to be reconstructed in each layer.

It is worth noting that the initial value input is 0 when all the results in the first layer are reconstructed in this embodiment, but when the data in other layers are calculated by the iterative algorithm, the initial value input is the calculated result at the corresponding position in the previous layer.

In the process of iteration, the relaxation factor $\lambda_{j,t,s}^k$ is not a constant. According to the steepest descent, $\lambda_{j,t,s}^k$ is as follows:

$$\lambda_{j,t,s}^k = \frac{\left\|W^T(P_{i,t,s} - WX_{t,s}^k) \cdot * [W^T(P_{i,t,s} - WX_{t,s}^k)]\right\|_1}{\left\|W^T W W^T (P_{i,t,s} - WX_{t,s}^k) \cdot * [W^T(P_{i,t,s} - WX_{t,s}^k)]\right\|_1}$$

where $X_{t,s}^k$ is a result obtained after k iterations of the data in the $t^{th}$ layer and the $s^{th}$ band, and W is the coefficient matrix.

In the process of iteration, a formula for determining convergence is provided as an end condition of the process:

$$\|P_{i,t,s} - WX_{t,s}^k\|_2 \leq 0.00001*99^2$$

In this way, the iteration process can be ended at approximate convergence, and the reconstruction process can be accelerated.

Finally, the coefficient matrix W is binarized according to whether the projection data from each angle is 0, to obtain the filter operator $Mask_t$ and then the iterative reconstruction result X is filtered:

$$X_{out_{t,s}} = X_{t,s} \cdot * Mask_t$$

where $X_{out_{t,s}}$ represents a filtered result in the $t^{th}$ layer and the $s^{th}$ band, $X_{t,s}$ is a result obtained after iterations in the $t^{th}$ layer and the $s^{th}$ band, and $Mask_t$ is a filter operator in the $t^{th}$ layer.

In this way, in this embodiment, a 3D image of the flame in 128 bands can be obtained. In order to visualize the results, the 3D spectral data of the flame can be displayed in different bands.

The device and the method provided by the present invention solve the problem of acquiring hyperspectral information and multi-FOV information of the flame from different angles, and reconstructing the 3D spectral information of the flame.

The invention claimed is:

1. A reconstruction method for 3D flame spectrum, comprising following the steps of:
   S1: placing a calibration cylinder in a combustion area to be reconstructed, capturing images of the calibration cylinder, and extracting corner coordinates of the calibration cylinder in a plurality of directions in the images of the calibration cylinder as corner coordinates of the combustion area to be reconstructed in the plurality of directions;
   S2: removing the calibration cylinder and setting a fire in the combustion area to be reconstructed, capturing images of a flame from different shooting angles synchronously by a plurality of prism-mask shooting systems and a plurality of mirrors disposed around the flame to obtain hyperspectral data of the flame, and pre-processing the data; and
   S3: reconstructing a 3D flame spectrum for each of a plurality of spectral channels by a 3D reconstruction algorithm of flame spectra,
   wherein each prism-mask shoot system is provided with two of the plurality of mirrors disposed on a left side and a right side of an axis of the prism-mask shooting system to reflect data of the flame into the prism-mask shooting system to acquire hyperspectral data of the flame.

2. The reconstruction method according to claim 1, wherein pre-processing in the step (2) comprises the steps of:
   prospectively transforming, by the corner coordinates of the area to be reconstructed extracted in the step (1), the hyperspectral flame data obtained by capturing images into a matrix of a fixed size for data alignment;
   denoising the aligned data; and
   integrating the denoised data obtained from a same layer and of different shooting angles into a vector, and integrating a plurality of vectors of the denoised data from different layers and different bands into a 3D matrix B, wherein the three dimensions of the matrix represent projection ray, layer, and band, respectively.

3. The reconstruction method according to claim 1, wherein, in S3, the 3D flame spectrum in each spectral channel is reconstructed by a joint iterative algorithm, wherein a correction term of the image in the current iteration is a sum of errors between projected pixels generated by all rays intersecting at $j^{th}$ pixel and projected pixels corrected in a previous iteration according to the following equations:

$$x_{j,t,s}^k = \begin{cases} 0 + \lambda_{j,t,s}^k w_{ij} \sum_{i=1}^{M}\left(P_{i,t,s} - \sum_{n=1}^{N}(w_{in} \times 0)\right), t=1, k=1 \\ x_{j,t-1,s} + \lambda_{j,t,s}^k w_{ij} \sum_{i=1}^{M}\left(P_{i,t,s} - \sum_{n=1}^{N}(w_{in} x_{n,t-1,s})\right), t \neq 1, k=1 \\ x_{j,t,s}^{k-1} + \lambda_{j,t,s}^k w_{ij} \sum_{i=1}^{M}\left(P_{i,t,s} - \sum_{n=1}^{N}(w_{in} x_{n,t,s}^{k-1})\right), \text{other} \end{cases}$$

wherein $x_{j,t,s}^k$ represents a result obtained after the $k^{th}$ iteration of the $j^{th}$ pixel to be reconstructed in the $t^{th}$ layer and the $s^{th}$ band, $x_{j,t,s}$ represents a result obtained after iterations of the $j^{th}$ projected pixel in the $t^{th}$ layer and the $s^{th}$ band, $p_{i,t,s}$=B (i, t, s) represents the $i^{th}$ projected pixel in the $t^{th}$ layer and the $s^{th}$ band, $\lambda_{j,t,s}^k$, is a relaxation factor for the current iteration, and $w_{ij}$ represents the contribution of the $j^{th}$ pixel to the $i^{th}$ projected pixel, which is the length of rays in each pixel; M represents the number of projected pixels, and N represents the number of pixels to be reconstructed in each layer.

4. The reconstruction method according to claim 3, wherein, for initial value assignment in the joint iterative reconstruction algorithm in each band, an initial value for iteration of the data in the first layer is a zero vector, and an initial value for iterations of the data in other layers is the iterated result of the data in the previous layer.

5. The reconstruction method according to claim 4, wherein, in the joint iterative reconstruction algorithm, the relaxation factor $\lambda_{j,t,s}^k$ is obtained by steepest descent according to:

$$\lambda_{j,t,s}^k = \frac{\left\| W^T(P_{i,t,s} - WX_{t,s}^k) \cdot * [W^T(P_{i,t,s} - WX_{t,s}^k)] \right\|_1}{\left\| W^T W W^T(P_{i,t,s} - WX_{t,s}^k) \cdot * [W^T(P_{i,t,s} - WX_{t,s}^k)] \right\|_1}$$

wherein $X_{t,s}^k$ is a result obtained after k iterations of the data in the $t^{th}$ layer and the $s^{th}$ band, W is a coefficient matrix, $W^T$ is a transpose of the matrix, and $\|\ \|_1$ represents finding 1-norm.

6. The reconstruction method according to claim 5, wherein, in the joint iterative reconstruction algorithm, a formula for determining convergence is provided as an end condition of the iteration process:

$$\|P_{i,t,s} - WX_{t,s}^k\|_2 \leq \varepsilon * N,$$

wherein $\varepsilon$ is a default threshold.

7. The reconstruction method according to claim 6, wherein, in the joint iterative reconstruction algorithm, the coefficient matrix W is binarized according to projection information from each shooting angle to obtain a filter operator, and the results obtained after iterations are filtered according to:

$$X_{out_{t,s}} = X_{t,s} * \text{Mask}_t,$$

wherein $X_{out_{t,s}}$ represents a filtered result in the $t^{th}$ layer and the $s^{th}$ band, $X_{t,s}$ is a result obtained after iterations in the $t^{th}$ layer and the $s^{th}$ band, and $\text{Mask}_t$ is the filter operator in the $t^{th}$ layer.

* * * * *